(12) United States Patent
Elliot et al.

(10) Patent No.: US 11,331,738 B2
(45) Date of Patent: May 17, 2022

(54) HIGH TEMPERATURE RESISTANT SILICON JOINT FOR THE JOINING OF CERAMICS

(71) Applicant: Watlow Electric Manufacturing Company, St. Louis, MO (US)

(72) Inventors: Brent Elliot, Cupertino, CA (US); Alfred Grant Elliot, Palo Alto, CA (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 16/677,245

(22) Filed: Nov. 7, 2019

(65) Prior Publication Data

US 2021/0086277 A1 Mar. 25, 2021

Related U.S. Application Data

(63) Continuation of application No. 14/977,590, filed on Dec. 21, 2015, now Pat. No. 10,471,531.

(51) Int. Cl.
| | | |
|---|---|---|
| *B23K 1/00* | (2006.01) |
| *B23K 1/19* | (2006.01) |
| *B23K 35/28* | (2006.01) |
| *B23K 35/30* | (2006.01) |
| *B23K 35/36* | (2006.01) |
| *C04B 37/00* | (2006.01) |
| *C04B 35/581* | (2006.01) |

(52) U.S. Cl.
CPC ............. *B23K 1/0016* (2013.01); *B23K 1/19* (2013.01); *B23K 35/286* (2013.01); *B23K 35/302* (2013.01); *B23K 35/36* (2013.01); *C04B 35/581* (2013.01); *C04B 37/003* (2013.01); *C04B 37/006* (2013.01); *C04B 2237/16* (2013.01); *C04B 2237/366* (2013.01)

(58) Field of Classification Search
CPC ................ C04B 35/581; C04B 37/006; C04B 2237/366; C04B 2237/16; B23K 35/30; B23K 35/32
See application file for complete search history.

(56) References Cited

U.S. PATENT DOCUMENTS

| | | | |
|---|---|---|---|
| 3,813,759 A | 6/1974 | Heap et al. |
| 5,368,220 A | 11/1994 | Mizuhara et al. |
| 6,884,511 B1 * | 4/2005 | Rossing ................ C04B 35/565 |
| | | | 428/426 |
| 2013/0186940 A1 * | 7/2013 | Elliot ...................... B32B 9/005 |
| | | | 228/121 |

FOREIGN PATENT DOCUMENTS

| | | |
|---|---|---|
| JP | 2006282419 | 10/2006 |
| WO | 2013082564 | 6/2013 |

* cited by examiner

*Primary Examiner* — Alex B Efta
(74) *Attorney, Agent, or Firm* — Burris Law, PLLC

(57) ABSTRACT

A method for the joining of ceramic pieces with a hermetically sealed joint comprising brazing a layer of joining material between the two pieces. The ceramic pieces may be aluminum nitride or other ceramics, and the pieces may be brazed with a high purity silicon or a silicon alloy under controlled atmosphere. The joint material is adapted to later withstand both the environments within a process chamber during substrate processing, and the oxygenated atmosphere which may be seen within the interior of a heater or electrostatic chuck.

20 Claims, 16 Drawing Sheets

HIGH TEMPERATURE RESISTANT SILICON JOINT FOR THE JOINING OF CERAMICS

CROSS-REFERENCE TO RELATED APPLICATIONS

This application is a continuation of U.S. patent application Ser. No. 14/977,590 to Elliot et al., filed Dec. 21, 2015, which claims priority to U.S. Provisional Patent Application No. 62/098,334 to Elliot et al., filed Dec. 31, 2014, which is hereby incorporated by reference in its entirety.

BACKGROUND

Field of the Invention

The present invention relates to methods for joining together objects, and more particularly to brazing methods for joining ceramic objects.

Description of Related Art

Semiconductor processing and similar manufacturing processes typically employ thin film deposition techniques such as Chemical Vapor Deposition (CVD), Physical Vapor Deposition (PVD), Vapor Phase Epitaxy (VPE), Reactive Ion Etching, and other processing methods. In CVD processing, as well as in other manufacturing techniques, a substrate such as a silicon wafer is secured within a processing chamber using semiconductor processing equipment, such as a heater or an electrostatic chuck, and exposed to the particular processing conditions of the process. The heater or electrostatic chuck is essentially a pedestal that, in addition to securing the substrate, can in some instances also be used to heat the substrate.

As heaters are exposed to high operating temperatures and corrosive process gasses, and because good thermal conductivity is required for good temperature control, prior art heaters have been made from a very limited selection of materials, such as aluminum nitride (AlN) ceramic or PBN, silicon dioxide (quartz), graphite, and various metals such as aluminum alloys, nickel alloys, stainless steel alloys, Inconel, etc. Reactive process gasses which are typically used for semiconductor processing, or chamber cleaning, generally react with heaters made with metal alloys. These reactions can produce corrosive by-products and other effects which can be detrimental to the desired process results. Ceramic materials can be much more resistant to reactions with typical process gasses, and to corrosion from reaction by-products. However, ceramic materials can have limited methods of fabrication due to inherent material properties, and have high manufacturing costs.

The manufacture of semiconductor processing equipment using ceramics, such as heaters and electrostatic chucks with a ceramic shaft and a ceramic plate, currently involves hot pressing sub-components to partial density, and then again hot pressing an entire assembly until full density is attained. In this type of manufacture, at least two drawbacks are seen. First, the hot pressing/sintering of a large, complex ceramic piece requires a large physical space, and a multiplicity of sequential sintering steps is required. Second, should a portion of the finished piece become damaged, or fail due to wear, there is no repair method available to disassemble the large piece, likely leading to it being scrapped. In the case of manufacture from two or more pieces which have already been pressed to full density, there are also at least two drawbacks. First, after the initial sintering of the major components, these components are typically joined using a liquid phase sintering process to join the major components (in the case of aluminum nitride, for example), which requires high heat, high compressive force, and a significant amount of time in a process oven capable of providing both the high temperatures and the high compressive force. Often the high compressive force applied to a shaft during this sintering to a plate, such as is done in the process of creating a ceramic heater, requires that the annular shaft walls be of thicker cross-sectional thickness than desired in the finished product in order to support these compressive forces. The shaft may then need to be machined down to a final lesser thickness desired to keep heat flow down the shaft to a minimum. Second, should a portion of the finished piece become damaged, or fail due to wear, there is no repair method available to successfully disassemble a large piece that has been joined in this fashion, likely leading to it being scrapped.

An additional concern may be with regard to the repair of these pieces of semiconductor processing equipment, such as heater and electrostatic chucks with plate and shaft elements. Should a portion of a multi-piece assembly of equipment be damaged, such as due to arcing, for example, it may be desirable to dis-assemble the piece of equipment and re-use portions of it. These portions may retain significant financial value. With current methods of manufacturing, for example with regards to ceramic heaters, there is no method available which would allow for the repair of equipment which would allow replacement of some portions and the re-use of some portions of that equipment.

U.S. Pat. No. 8,789,743 discloses a method for joining ceramic materials which does address the above-mentioned drawbacks of other prior processes. The method includes using a high purity aluminum brazing material at temperatures which result in good and complete wetting, and hermetic joints without diffusion. A limitation on these joints, however, is that the equipment made using these joints cannot be used at higher temperatures, such as 700 C-1400 C, as that is significantly above the solidus temperature of the aluminum braze material.

What is called for is a joining method for joining ceramic pieces which provides a hermetic seal, and which does nor diffuse into the ceramics and thus allows for repairs, and which is able to withstand subsequent exposure to processes run at higher temperatures.

SUMMARY OF THE INVENTION

A method for the joining of ceramic pieces with a hermetically sealed joint comprising brazing a layer of joining material between the two pieces. The ceramic pieces may be aluminum nitride or other ceramics, and the pieces may be brazed with a high purity silicon, or a silicon alloy, under controlled atmosphere. The joint material may be adapted to later withstand both the environments within a process chamber during substrate processing, and the oxygenated atmosphere which may be seen within the interior of a heater or electrostatic chuck.

DETAILED DESCRIPTION

Figure 1:
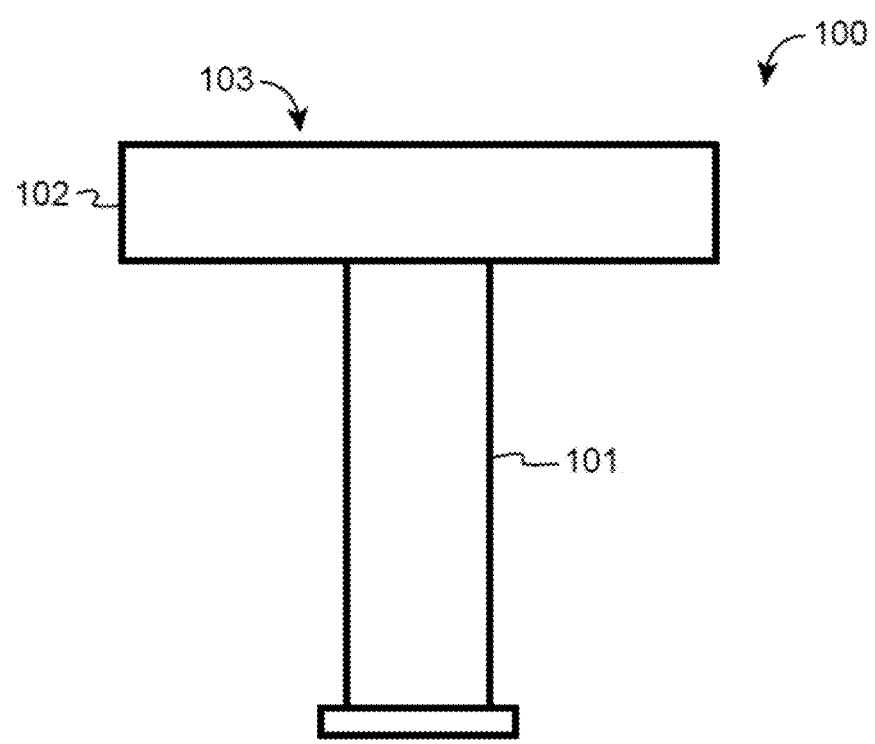
FIG. 1 is a view of a plate and shaft device used in semiconductor processing according to some embodiments of the present invention.

Some prior processes for the joining of ceramic materials required specialized ovens, and compression presses within the ovens, in order to join the materials. For example, with liquid phase sintering, two pieces may be joined together under very high temperatures and contact pressures. The high temperature liquid-phase sintering process may see temperatures in the range of 1700 C and contact pressures in the range of 2500 psi.

Other prior processes may utilize diffusion of a joining layer into the ceramic, and/or of the ceramic into the joining layer. In such processes, a reaction at the joint area may cause changes to the material composition of the ceramic in the area near the joint. This reaction may depend upon oxygen in the atmosphere to promote the diffusion reaction.

In contrast to the aforementioned diffusion processes, joining methods according to some embodiments of the present invention do not depend upon liquid phase sintering or diffusion.

In some applications where end products of joined ceramics are used, strength of the joint may not be the key design factor. In some applications, hermeticity of the joint may be required to allow for separation of atmospheres on either side of the joint. Also, the composition of the joining material may be important such that it is resistant to chemicals which the ceramic assembly end product may be exposed to. The joining material may need to be resistant to the chemicals, which otherwise might cause degeneration of the joint, and loss of the hermetic seal. The joining materials may also need to be of types of materials which do not negatively interfere with the processes later supported by the finished ceramic device.

In the processing of substrates, many processes require that the substrate be supported by semiconductor processing equipment components, such as a heater or an electro-static chuck. These components may be maintained at, or required to operate in, vacuum conditions, high temperatures, thermal cycling, corrosive atmospheres, and may be damaged during their use during semiconductor manufacturing processes or otherwise. In some aspects, these components may be comprised substantially or comprised fully of a ceramic such as aluminum nitride. The manufacture of these components from such a material has involved costly materials, and is time and equipment intensive, resulting in a very expensive end product.

Prior methods of manufacturing components such as heaters and electrostatic chucks using ceramic materials have required process steps with specialized atmospheres (such as vacuum, inert, or reducing atmospheres), very high temperatures, and very high contact pressures. The contact pressures may be applied using presses, and these presses may be adapted to operate inside a process chamber that provides the specialized atmospheres, such as vacuum, and high temperatures. This may require specialized presses and fixturing made of refractory materials, such as graphite, within the process chamber. The cost and complexity of these setups may be very high. In addition, the larger the component that is required to be pressed, the fewer components can be put into such a process oven. As the duration of the processes in the process ovens with presses may be measured in days, and given the large expense associated with both the manufacture of and the running of the process ovens/presses, a reduction in the number of steps which use these process ovens which provide very high temperature, special atmospheres, and very high contact pressures during the manufacture of components will result in great savings.

Figure 2:
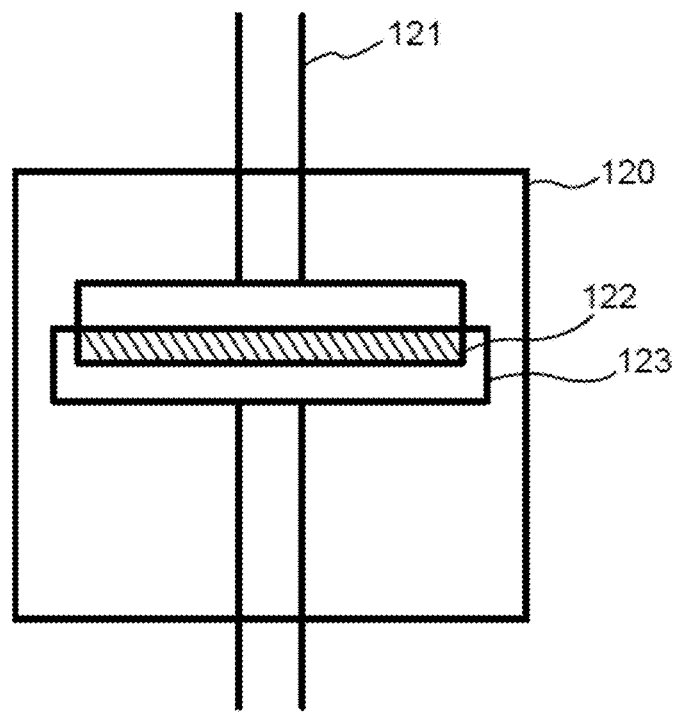
FIG. 2 is a sketch of a high temperature press and oven for a plate according to some embodiments of the present invention.

FIG. 1 illustrates an exemplary plate and shaft device 100, such as a heater, used in semiconductor processing. In some aspects, the plate and shaft device 100 is composed of a ceramic, such as aluminum nitride. Other materials, such as alumina, silicon nitride, silicon carbide or beryllium oxide, may be used. In other aspects the plate may be aluminum nitride and the shaft may be zirconia, alumina, or other ceramic. The heater has a shaft 101 which in turn supports a plate 102. The plate 102 has a top surface 103. The shaft 101 may be a hollow cylinder. The plate 102 may be a flat disc. Other subcomponents may be present. In some present processes, the plate 102 may be manufactured individually in an initial process involving a process oven wherein the ceramic plate is formed. FIG. 2 conceptually illustrates a process oven 120 with a press 121. The plate 122 may be compressed under temperature in a fixture 123 adapted to be pressed by the press 121. The formation of the plate 122 would be one of many processes needed to be performed with a very specialized process oven. The shaft 101 may also be similarly manufactured in a process step. The formation of the shaft 163 would be another of the processes needed to be performed with a very specialized process oven. In a typical process, the plate and shaft are formed by loading of aluminum nitride powder incorporating a sintering aide such as yttria at about 4 weight % into a mold, followed by compaction of the aluminum nitride powder into a "solid"

state typically referred to as "green" ceramic, followed by a high-temperature liquid-phase sintering process which densifies the aluminum nitride powder into a solid ceramic body. The high temperature liquid-phase sintering process may see temperatures in the range of 1700 C and contact pressures in the range of 2500 psi. The bodies are then shaped into the required geometry by standard grinding techniques using diamond abrasives.

There are multiple functions of the shaft: one is to provide vacuum-tight electrical communication through the wall of the vacuum chamber in order to apply electrical power to heater elements as well as a variety of other electrode types which may be embedded within the heater plate. Another is to allow temperature monitoring of the heater plate using a monitoring device such as a thermocouple, and allowing that thermocouple to reside outside of the processing chamber environment in order to avoid interaction such as corrosion between the materials of the thermocouple and the process chemicals, as well as allowing the thermocouple junction to operate in a non-vacuum environment for rapid response. Another function is to provide isolation of the materials used for the previously mentioned electrical communication from the processing environment. Materials used for electrical communication are typically metallic, which could thereby interact with process chemicals used in the processing environment in ways which could be detrimental to the processing results, and detrimental to the lifetime of the metallic materials used for electrical communication.

Figure 3:
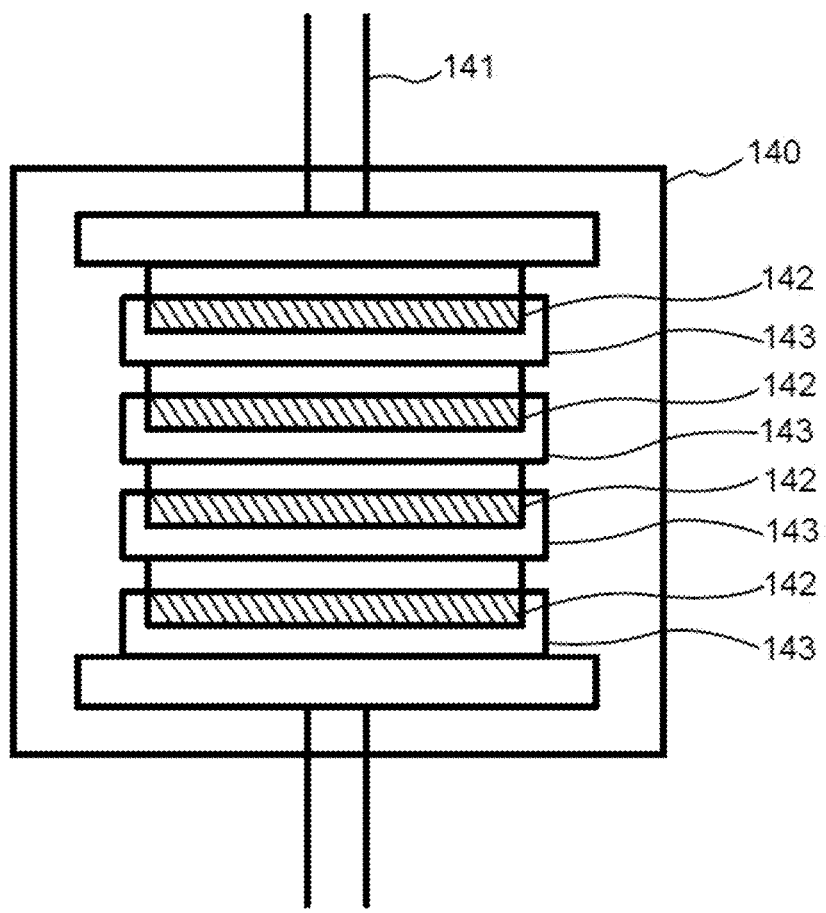
FIG. 3 is a sketch of a high temperature press and oven for a plurality of plates according to some embodiments of the present invention.

Given the relatively flat nature of the plate, a plurality of plates 142 may be formed in a single process by stacking a plurality of plate molding fixtures 143 along the axial direction of the press 141 which resides within the process oven 140, as seen conceptually in FIG. 3. The shafts may also be formed in a similar process using the press in the process oven, wherein multiple shafts are made simultaneously side by side, for example.

In the overall process of manufacturing a heater used in semiconductor processing both the step of forming plates and forming shafts require significant commitments of time and energy. Given the cost of the specialized high temperature ovens, and that the process steps of forming the plates and forming the shafts each may require the use of a specialized process oven for days, a considerable investment of both time and money has been invested just to get the overall process to the point where the shaft and plate have been completed. Yet a further step in the specialized process oven is required in present processes to affix the plate to the shaft. An example of this step would be to join the shaft to the plate using a liquid phase sintering step in the specialized high temperature process oven with a press. This third step in the specialized process oven also requires significant space in such a process oven as the assembled configuration of the heater includes both the length of the shaft and the diameter of the plate. Although the manufacture of just the shafts may take a similar amount of axial length, the diameter of the shafts is such that multiple shafts may be produced in parallel in a single process.

Figure 4:
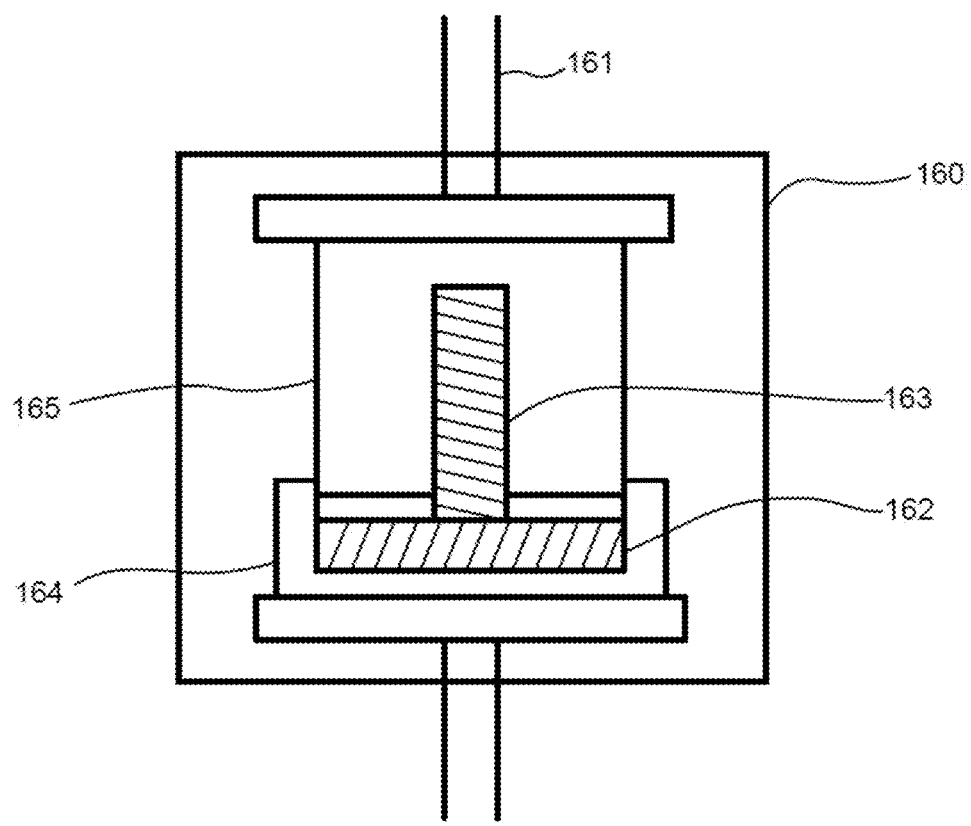
FIG. 4 is a sketch of a high temperature press and oven for a plate and shaft device according to some embodiments of the present invention.

As seen in FIG. 4, the joining process to sinter the shaft to the plate again requires the use of a process oven 160 with a press 161. A set of fixturing 164, 165 is used to position the plate 162 and the shaft 163, and to transmit the pressure delivered by the press 161.

Once the heater is completed, it may be used in semiconductor processing. The heater is likely to be used in harsh conditions, including corrosive gasses, high temperatures, thermal cycling, and gas plasmas. In addition, the heater may be subject to inadvertent impacts. Should the plate or the shaft become damaged, the opportunities for repair of a plate and shaft device joined by liquid phase sintering are limited, perhaps non-existent.

Another prior method for joining ceramic shafts to ceramic plates involves the bolting of the shaft to the plate. Such systems are not hermetic even where the adjoining surfaces are polished to enhance the quality of the seal. A constant positive purge gas pressure is required into the inside of the shaft to reduce process gas infiltration.

An improved method for manufacturing semiconductor processing equipment may involve the joining of a shaft and a plate, which have been described above, into a final joined assembly without the time consuming and expensive step of an additional liquid phase sintering with high temperatures and high contact pressures. The shaft and plate may be joined with a brazing method for joining ceramics. An example of a brazing method for joining together first and second ceramic objects may include the steps of bringing the first and second objects together with a silicon binder, heating the silicon binder to a temperature of at least 1414 C in vacuum, and cooling the silicon binder to a temperature below its melting point so that the binder hardens and creates a hermetic seal so as to join the first member to the second member. In other aspects, alloys of silicon may be used in order to reduce, or to slightly reduce, the solidus temperature. Depending upon the processes intended to be run with the completed ceramic piece, in the case of semiconductor processing equipment, a silicon alloy may be selected which has a solidus temperature above the process temperature, and which has a composition compatible with the processing environment. Various geometries of braze joints may be implemented according to methods described herein.

Figure 5A:
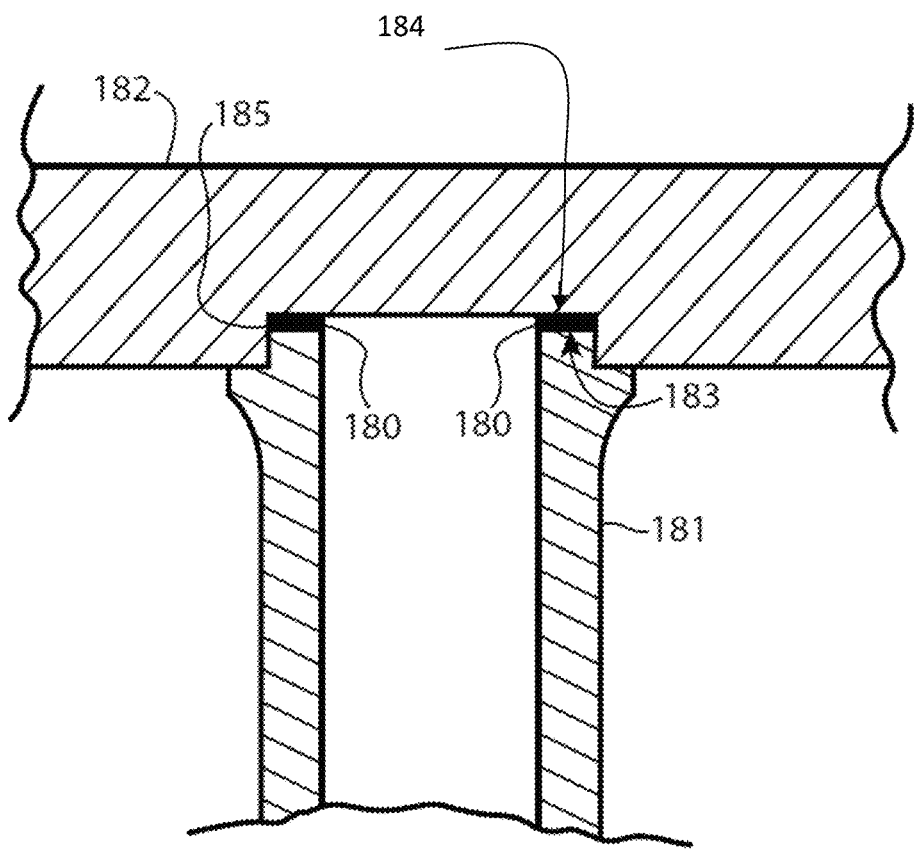
FIG. 5A is a cross-sectional view of a joint between a plate and shaft according to some embodiments of the present invention.

FIG. 5A shows a cross section of a first embodiment of a joint in which a first ceramic object, which may be a ceramic shaft 181, for example, may be joined to a second ceramic object, which may be made of the same or a different material, and which may be a ceramic plate 182, for example. A braze filler material 180 may be included, which can be selected from the combinations of braze materials or binders described herein and may be delivered to the joint according to the methods described herein. With respect to the joint depicted in FIG. 5A, the shaft 181 is positioned such that it abuts the plate, with only the braze filler interposed between the surfaces to be joined, for example end surface 183 of the end 185 of the shaft 181 and an interface surface 184 of the plate 182. The thickness of the joint is exaggerated for clarity of illustration.

Although an exemplary embodiment utilized to illustrate the joining of ceramics according to aspects of the present invention is that of joining a plate to a shaft, such as may be done when manufacturing a heater or electrostatic chuck used in semiconductor processing, it is to be understood that the joining of ceramics with silicon according to aspects of the present invention is not limited to such an embodiment. The joining of ceramics with silicon brazing methods as described herein is itself a novel and useful approach for the joining of ceramics.

Figure 5B:
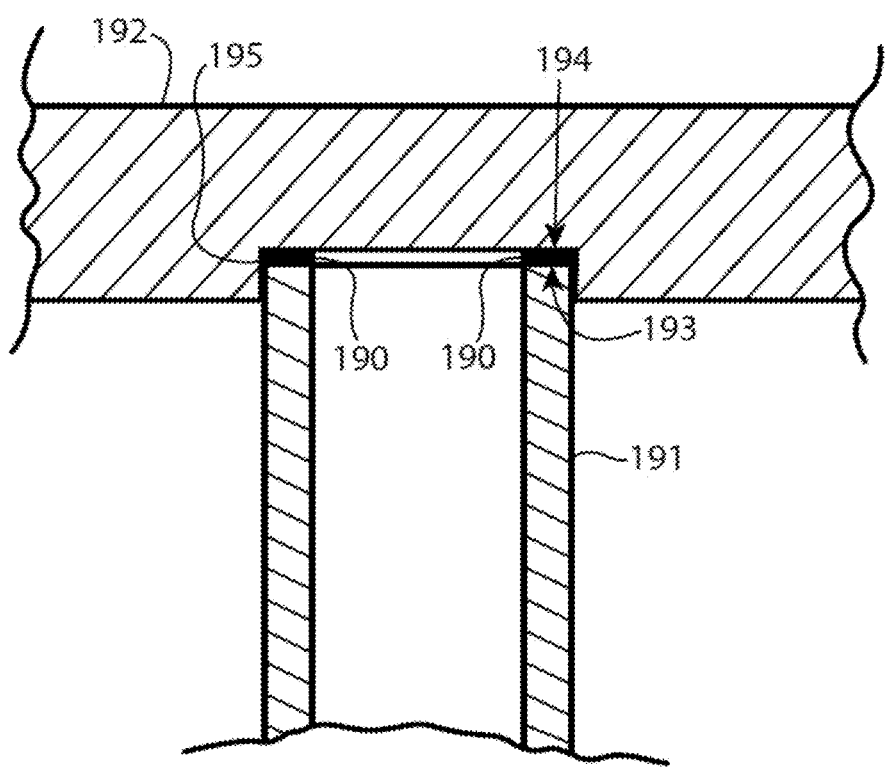
FIG. 5B is a cross-sectional view of a joint between a plate and shaft according to some embodiments of the present invention.

FIG. 5B shows a cross section of a second embodiment of a joint in which a first ceramic object, which may be a ceramic shaft 191, for example, may be joined to a second ceramic object, which may be made of the same or a different material, and which may be a ceramic plate 192, for example. A joining material, such as braze filler material 190, may be included, which can be selected from the combinations of braze materials or binders described herein and may be delivered to the joint according to the methods described herein. With respect to the joint depicted in FIG.

5B, the shaft 191 is positioned such that it abuts the plate, with only the braze filler interposed between the surfaces to be joined, for example surface 193 of the shaft and surface 194 of the plate. The interface surface 194 of the plate 192 may reside in a recess 195 in the plate. The thickness of the joint is exaggerated for clarity of illustration.

Figure 5C:
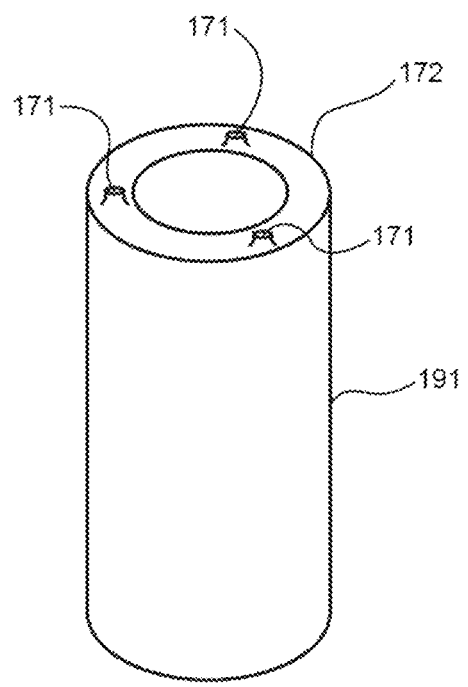
FIG. 5C is a perspective view of a shaft end with standoffs according to some embodiments of the present invention.

The embodiments as illustrated in FIGS. 5A and 5B may include a plurality of standoffs adapted to maintain a minimum braze layer thickness. In some embodiments, as seen in FIG. 5C, the shaft 191 may utilize a plurality of mesas 171 on the end 172 of the shaft 191 which is to be joined to the plate. The mesas 171 may be part of the same structure as the shaft 191, and may be formed by machining away structure from the shaft, leaving the mesas. In some embodiments, the mesas may be used to create a minimum braze layer thickness of the remainder of the shaft end 172 from the mating surface of the plate. In some embodiments, the braze filler material, prior to brazing, will be thicker than the distance maintained by the mesas between the shaft end and the plate. With appropriate tolerance control on the interface surface of the plate and of the shaft and mesas, the tolerance control of the finished plate and shaft device may be achieved as the mesas move to contact the plate interface during the brazing step. In some embodiments, other methods may be used to establish a minimum braze layer thickness. In some embodiments, ceramic spheres may be used to establish a minimum braze layer thickness.

Figure 6:
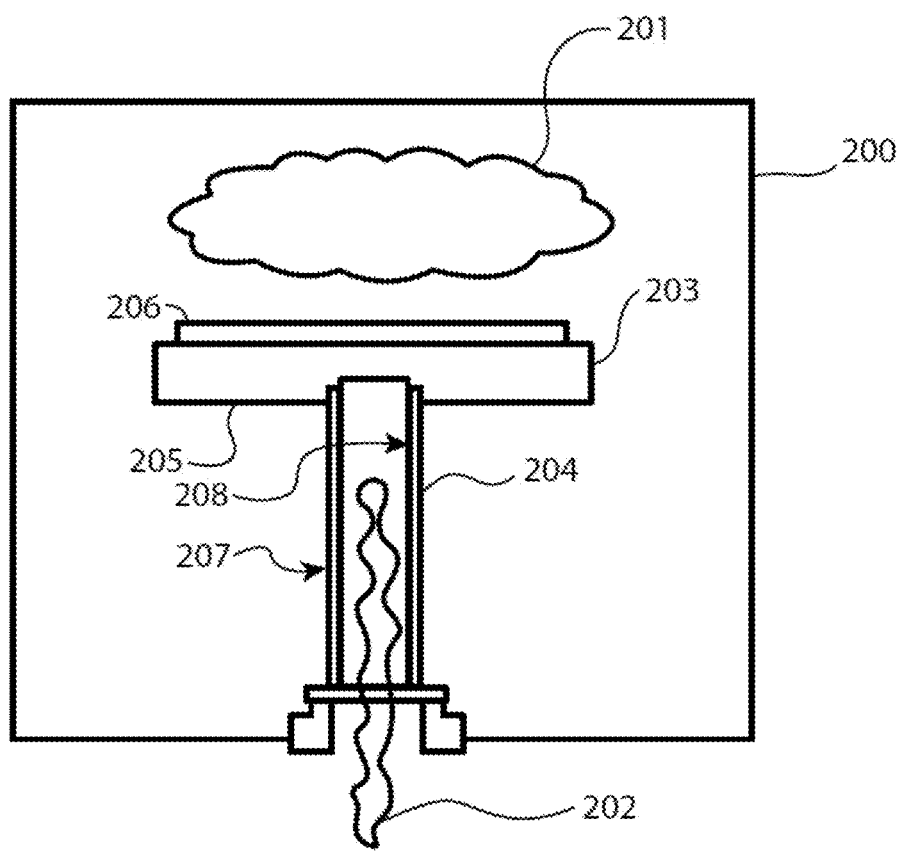
FIG. 6 is a partial cross-sectional view of a plate and shaft device in use in semiconductor manufacturing according to some embodiments of the present invention.

As seen in FIG. 6, the brazing material may bridge between two distinct atmospheres, both of which may present significant problems for prior brazing materials. On an external surface 207 of the semiconductor processing equipment, such as a heater 205, the brazing material must be compatible with the processes occurring in, and the environment 201 present in, the semiconductor processing chamber 200 in which the heater 205 will be used. The heater 205 may have a substrate 206 affixed to a top surface of the plate 203, which is supported by a shaft 204. On an internal surface 208 of the heater 205, the brazing material must be compatible with a different atmosphere 202, which may be an oxygenated atmosphere. Prior brazing materials used with ceramics have not been able to meet both of these criteria. For example, braze elements containing copper, silver, or gold may interfere with the lattice structure of the silicon wafer being processed, and are thus not appropriate. However, in the case of a brazed joint joining a heater plate to a heater shaft, the interior of the shaft typically sees a high temperature, and has an oxygenated atmosphere within the center of a the hollow shaft. The portion of the braze joint which would be exposed to this atmosphere will oxidize, and may oxidize into the joint, resulting in a failure of the hermeticity of the joint. In addition to structural attachment, the joint between the shaft and the plate of these devices to be used in semiconductor manufacturing must be hermetic in many, if not most or all, uses.

A braze material which will be compatible with both of the atmospheres seen on both sides across a joint in such a device is silicon. The braze material may be in the form of a sheet, a powder, a thin film, or be of any other form factor suitable for the brazing processes described herein. In some embodiments, braze layers which are 0.001 to 0.010 inches thick are used. In some embodiments, silicon with a purity of greater than 99% is used. In some embodiments, silicon with a purity of greater than 98% is used. The solidus temperature of pure silicon is approximately 1414 C. The maximum practical temperature that silicon can be exposed to as a joining material is approximately 1625 C, at which point it begins to evaporate at an excessive rate.

In some aspects, "pure" silicon is used as the braze layer. "Pure" silicon, in the language of the technology, may be one of many available commercial products referred to as "pure" silicon, but these may be 98.6%, 99.0%, or 99.7%, to use some common examples. With regard to the present invention, pure silicon may be silicon in excess of 98% purity, or greater than 99% purity. Another aspect of using a braze layer of silicon, as opposed to a silicon alloy as discussed below, is that if the silicon has nothing mixed within it that results in a compound with Si when brazed, then that is referred to as a non-compounding element. In contrast, if a Si alloy utilizes an element which does compound with Si during brazing, this is referred to as a compounding element and results in the formation of an Si eutectic or an Si peretactic brazing when heated for brazing.

Separate from elements which remain in the assembly after brazing, or which form other compounds which remain in the assembly after brazing, there may be materials in the braze layer which are present only prior to the brazing process, and then evaporate or burn off during brazing. As a specific example, a binder may be used to help properly locate a Si powder to be used as a braze layer. A binder, such as methyl cellulose mixed with a solvent, may be used to locate the Si in the desired location for the braze layer, especially when using a powdered form of Si. The binder will disappear before the temperatures approach the Si braze temperatures. When discussing the purity of the silicon brazing layer, the purity after brazing, after the binder disappears, is what is viewed as the purity of the silicon brazing layer. For example, if a significant percentage of the pre-braze braze layer material included something such as methyl cellulose, that percentage would not be in the final braze layer after heating for brazing.

In some aspects, it may be desirable to get the advantages of using silicon as a brazing material but it may be disadvantageous to braze at such a high temperature. Some alloys of silicon have solidus temperatures much lower than that of pure silicon. If compatible with later seen processing chemistries, a variety of alloys may be used to provide a lower solidus temperature, such that a more practical process oven may be used to effect the braze.

Figure 7:
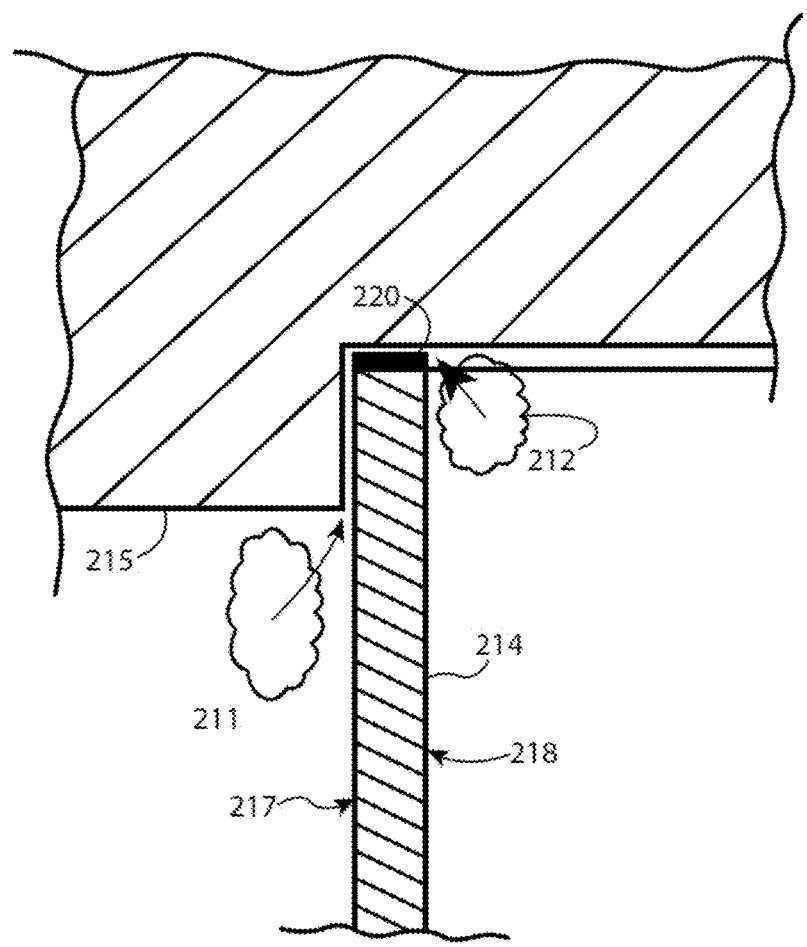
FIG. 7 is a close-up cross-sectional view of a joint between and shaft and a plate according to some embodiments of the present invention.

FIG. 7 illustrates a joint 220 used to join a plate 215 to a shaft 214 according to some embodiments of the present invention. The joint 220 has created a structural and hermetic joint which structurally supports the attachment of the plate 215 to the shaft 214. The joint 220 has created a hermetic seal which isolates the shaft atmosphere 212 seen by the interior surface 218 of the shaft 214 from the chamber atmosphere 211 seen along the exterior surface 217 of the shaft 214 and within the process chamber. The joint 220 may be exposed to both the shaft atmosphere and the chamber atmosphere and must therefore be able withstand such exposure without degradation which may result in the loss of the hermetic seal. In this embodiment, the joint may be silicon and the plate and the shaft may be ceramic such as aluminum nitride. In some embodiments, the joint 220 may be of silicon, and which substantially remains in the joint region after the joining process. The residual silicon may allow for disjoining of the joint for repair, rework, or other reasons.

Figure 8:
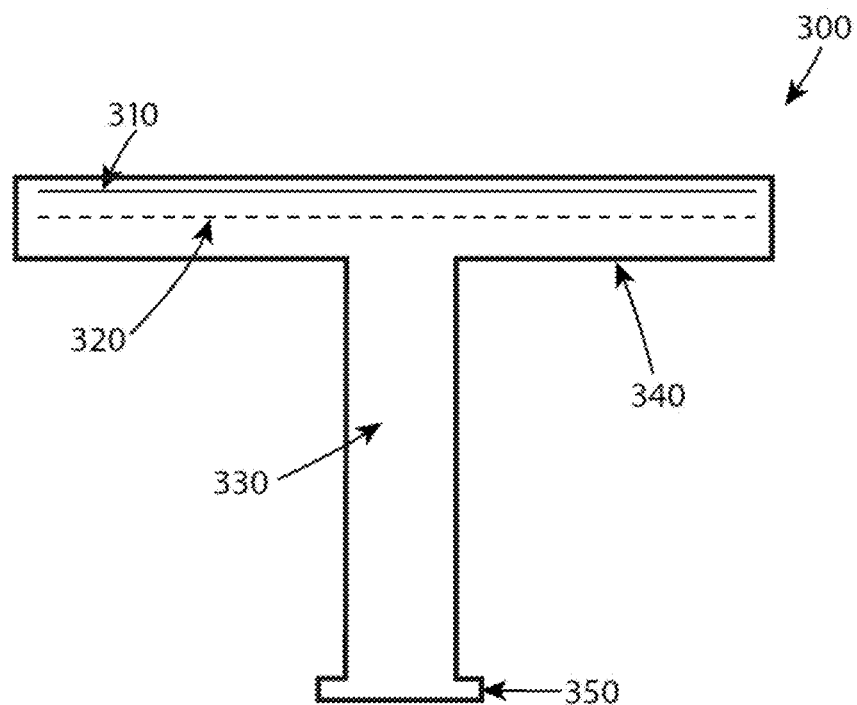
FIG. 8 is view of a plate and shaft device according to some embodiments of the present invention.

FIG. 8 shows one embodiment of a schematic illustration of a heater column used in a semiconductor processing chamber. The heater 300, which may be a ceramic heater, can include a radio frequency antenna 310, a heater element 320, a shaft 330, a plate 340, and a mounting flange 350. One embodiment of a brazing method for joining together a shaft 330 and a plate 340, both or either one of which may be made of aluminum nitride, to form the heater 300 may be implemented as follows. In some embodiments, a poly-crystalline AlN is used, and is comprised of 96% AlN and 4% Yttria. Such a ceramic may be used in industrial applications because during the liquid phase sintering used to manufacture the ceramic, a lower temperature may be used. The lower temperature process, in contrast to polycrystalline AlN without a sintering aide, reduces manufacturing costs of the ceramic. The poly-crystalline AlN with added Yttria may also have preferred material properties, such a being less brittle. Yttria and other dopants are often used for manufacturability and tuning of material properties. With a poly-crystalline AlN such as 96% AlN-4% Yttria ceramic, the ceramic presents grains of AlN which are interspersed with yttrium aluminate. The non-susceptibility of AlN to diffusion with silicon under the conditions of processes according to embodiments of the present invention results in preservation of the material properties, and the material identity, of the ceramic after the brazing step in the manufacturing of the plate and shaft assembly.

A sheet of silicon or silicon alloy metal binder, or powder, or other type of filler may be provided between the shaft and the plate, and the shaft and the plate may be brought together with the sheet of the silicon binder disposed therebetween. In some embodiments, the silicon may be applied with sputtering techniques. In some embodiments, the silicon may be applied as a powder mixed with a binder, as discussed above, and painted on. The braze layer may then be heated in a vacuum to a temperature of at least 1414 C (in the case of pure silicon) melting the filler material and then cooled allowing the binder or filler to solidify, creating a hermetic seal joining the shaft to the plate. The shaft of said heater may be of solid material or it may be hollow in conformation.

In an exemplary embodiment, the plate and shaft may both be of aluminum nitride and both have been separately formed previously using a liquid phase sintering process. The plate may be approximately 9-13 inches in diameter and 0.5 to 0.75 inches thick in some embodiments. The shaft may be a hollow cylinder which is 5-10 inches long with a wall thickness of 0.1 inches. As previously seen in FIG. 5A, the plate 182 may have a recess 185 adapted to receive an outer surface of a first end of the shaft 181. As previously seen in FIG. 5C, mesas may be present on the end of the shaft which abuts the plate. The mesas may be 0.004 inches high. The plate 182 and shaft 181 may be fixtured together for a joining step with a brazing material 180 of silicon or silicon alloy powder placed between the pieces along the end of the shaft and within the recess of the plate. The brazing material may be 0.006 inches thick prior to brazing with a completed joint minimum thickness of 0.004 inches. The brazing material may be silicon with a purity greater than 99%.

Very little physical pressure, other than simple contact, may be required for joining. The low contact pressures needed for the joining of the plate to the shaft using the present methods may be able to be provided using simple fixturing, which may include a mass placed onto the fixturing using gravity to provide the contact pressure. In some embodiments, contact between the interface portion of the shaft and the brazing element, as well as contact between the interface portion of the plate and the brazing element, will provide contact pressure sufficient for joining. Thus, the fixture assembly need not be acted upon by a press separate from the fixture assembly itself. The fixtured assembly may then be placed in a process oven. The oven may be evacuated to a pressure of 1×10E-5 Torr. In some aspects, vacuum is applied to remove residual oxygen. In some embodiments, a vacuum of lower than 1×10E-4 Torr is used. In some embodiments, a vacuum of lower than 1×10E-5 Torr is used. Of note with regard to this step is that the high temperature oven with high contact pressure fixturing, which was required during the manufacture of the ceramic components (shaft and plate), is not needed for this joining of the shaft and plate. Upon initiating the heating cycle, the temperature may be raised slowly, to standardized temperatures, for example, 600 C and then the joining temperature, and held at each temperature for a fixed dwell time to allow the vacuum to recover after heating, in order to minimize gradients and/or for other reasons. When the braze temperature has been reached, the temperature can be held for a time to effect the braze reaction. In an exemplary embodiment, the dwell temperature may be 1425 C and the dwell time may be 10 minutes. Upon achieving sufficient braze dwell time, the furnace may be cooled at a rate of 20 C per minute, or lower when the inherent furnace cooling rate is less, to room temperature. The furnace may be brought to atmospheric pressure, opened and the brazed assembly may be removed for inspection, characterization and/or evaluation. In some aspects, the temperature dwell time may be between 1 minute and 1 hour. In some aspects, the temperature dwell time may be between 2 minutes and 10 minutes. In some aspects, the dwell temperature may be in the range of 1420 to 1460 C.

In some aspects, the brazing element is brought to a temperature above the melting (liquidus) temperature under a controlled atmosphere, which may be a vacuum. At the desired brazing temperature, the brazing element then flows over the substrate surfaces adjoining the filler material (wetting) and forming the basis of the desired joint. A vacuum ambient helps insure that residual gas existing in the joint region is removed insuring a more complete wetting of the joint surfaces including infusion of the liquid filler into any contours, pores, crevices, and readily accessible inter-granular spaces that may exist in the surfaces of the parts comprising the final joined item.

The wetting and flow of the brazing layer may be sensitive to a variety of factors. The factors of concern include the braze material composition, the ceramic composition, the composition of the ambient atmosphere during the joining process, which includes the level of oxygen in the chamber during the joining process, the temperature, the time at temperature, the thickness of the braze material, the surface characteristics of the material to be joined, the geometry of the pieces to be joined, and the physical pressure applied across the joint during the joining process.

In some embodiments, the plate and shaft may comprise different ceramics. The plate may be adapted to provide a high conductive heat coefficient, whereas the shaft may be adapted to provide a lower conductive heat coefficient such that heat is not lost down the shaft towards the mounting appurtenances of the process chamber. For example, the plate may be made of aluminum nitride and the shaft may be made of zirconia.

Figure 9:
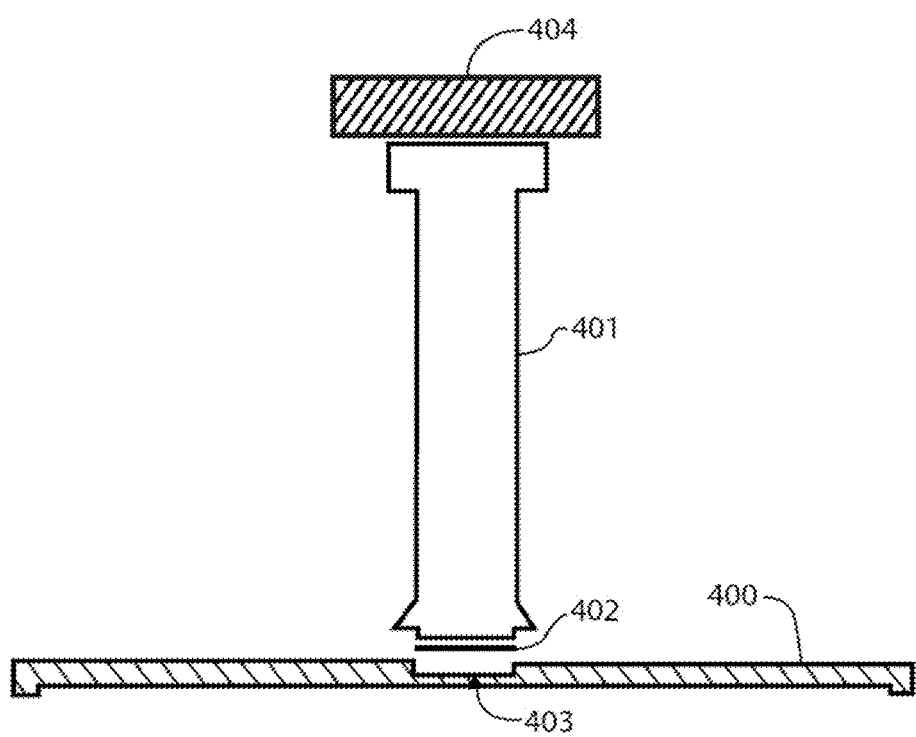
FIG. 9 is an illustration of plate and shaft ready for assembly according to some embodiments of the present invention.
Figure 10:
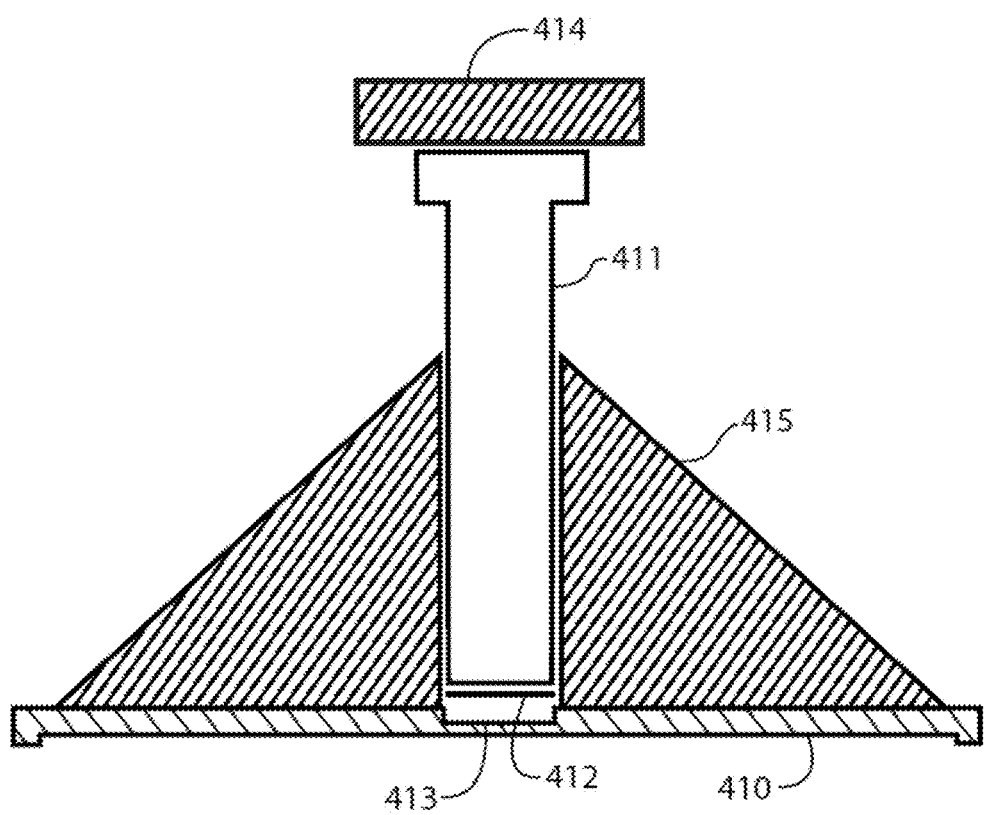
FIG. 10 is an illustration of plate and shaft with fixturing ready for assembly according to some embodiments of the present invention.
Figure 11:
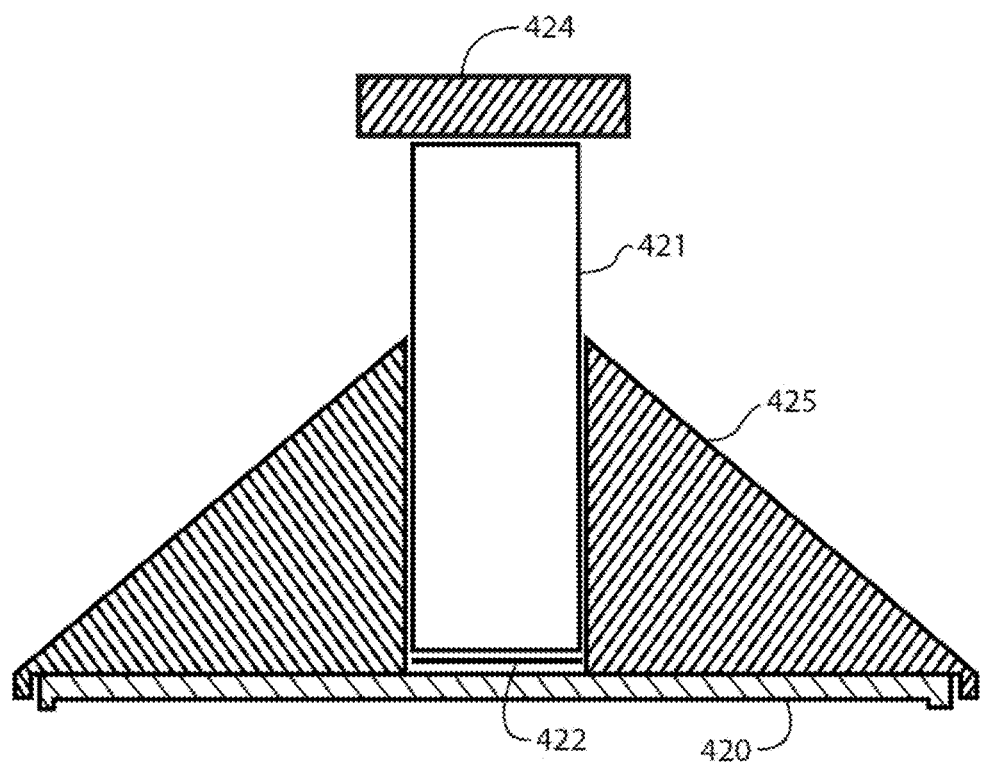
FIG. 11 is an illustration of plate and shaft with fixturing ready for assembly according to some embodiments of the present invention.

FIGS. 9-11 illustrate a joining process which may join a shaft to a plate according to some embodiments of the present invention. The joining process may be run in a process oven with lower temperatures, contact pressures, and lower time and cost commitments than in previous joining operations.

In some embodiments, as seen in FIG. 9, alignment and location of the shaft and plate is maintained by part geometries, eliminating fixturing and post-bond machining. Weighting may be used to insure there is no movement during bonding process, other than some axial movement as the braze material melts. The plate 400 may be placed top down with a joining element 402 within a recess 403 in the back surface of the plate 400. The shaft 401 may be inserted vertically downward into the recess 403 within the plate 400. A weight 404 may be placed on the shaft 401 to provide some contact pressure during the joining process.

In some embodiments, as seen in FIG. 10, location of the shaft and plate is maintained by part geometries, reducing post-bond machining. Fixturing may be required to maintain perpendicularity between shaft and plate during bond processing. In some embodiments, the tolerancing of the mesas and the interface portion of the plate may be used to control the dimensions and tolerances of the final assembly. Weighting may also be used to insure there is no movement during bonding process, other than some axial movement as the braze material melts. The plate 410 may be placed top down with a joining element 412 within a recess 413 in the back surface of the plate 410. The shaft 411 may be inserted vertically downward into the recess 413 within the plate 410. A fixture 415 is adapted to support and locate the shaft 411. A weight 414 may be placed on the shaft 411 to provide some contact pressure during the joining process. In some embodiments, a weight is not used. In some embodiments, the mass of the items to be joined may provide force, with gravity, to apply pressure between the items to be joined.

In some embodiments, as seen in FIG. 11, location and perpendicularity of shaft/plate is maintained by fixturing. Fixturing may not be precise due to thermal expansion and machining tolerances—therefore, post-bond machining may be required. The shaft diameter may be increased to accommodate required material removal to meet final dimensional requirements. Again, weighting may be used to insure there is no movement during bonding process, other than some axial movement as the braze material melts. The plate 420 may be placed top down with a joining element 422 above the back surface of the plate 420. The shaft 421 may be placed onto the plate 420 to create a plate and shaft pre-assembly. A fixture 425 is adapted to support and locate the shaft 421. The fixture 425 may be keyed to the plate to provide positional integrity. A weight 424 may be placed on the shaft 411 to provide some contact pressure during the joining process.

An aspect of the current invention is the maximum operating temperature of the bonded shaft-plate as defined by the decreasing tensile strength, with temperature, of the silicon or silicon alloy selected for the joining. For example, if pure silicon is employed as the joining material, the structural strength of the bond between the shaft and plate becomes quite low as the temperature of the joint approaches the melting temperature of the silicon, generally considered to be 1414 C. In practice, a silicon alloy with a lower joint melting temperature may be sufficient for the processing need. However, some semiconductor device fabrication processes, or other types of processes supported by equipment using joints according to some embodiments of the present invention, may require temperatures as high as 1400 C.

In embodiments using mesas or spheres as standoffs, the original thickness of the brazing layer prior to the application of heat may be slightly less than, equal to, or larger than the thickness of the final joint thickness maintained by the mesas or other devices. As the brazing layer temperature reaches and exceeds the liquidus temperature, pressure across the brazing layer between the pieces being joined may cause relative motion between the pieces until the mesas on a first piece contact an interface surface on a second piece. At that point, contact pressure across the joint will no longer be supplied by the external force (except as resistance to repulsive forces within the brazing layer, if any). The mesas, or other standoff technique such as ceramic spheres, may prevent the brazing layer from being forced out of the joint area prior to the full wetting of ceramic pieces, and may thus allow for better joining. In some embodiments, mesas are not used.

The fixtured assembly may then be placed in a process oven. The oven may be evacuated to a pressure of less than 5×10E-5 Torr. In some aspects, vacuum removes the residual oxygen. In some embodiments, a vacuum of lower than 1×10E-5 Torr is used. In some embodiments, the fixtured assembly is placed within a zirconium inner chamber which acts as an oxygen attractant, further reducing the residual oxygen which might have found its way towards the joint during processing. In some embodiments, the process oven is purged and re-filled with pure, dehydrated pure noble gas, such as argon gas, to remove the oxygen. In some embodiments, the process oven is purged and re-filled with purified hydrogen to remove the oxygen.

The fixture assembly is then subjected to increases in temperature, and a hold at the joining temperature. Upon initiating the heating cycle, the temperature may be raised slowly, for example 15C per minute to 200 C and then 20 C per minute thereafter, to standardized temperatures, for example, 1000 C and the joining temperature, and held at each temperature for a fixed dwell time to allow the vacuum to recover after heating, in order to minimize gradients and/or for other reasons. When the braze temperature has been reached, the temperature can be held for a time to effect the braze reaction. In an exemplary embodiment, the dwell temperature may be 1440 C and the dwell time may be 10 minutes. Upon achieving sufficient braze dwell time, the furnace may be cooled at a rate of 20 C per minute, or lower when the inherent furnace cooling rate is less, to room temperature. The furnace may be brought to atmospheric pressure, opened and the brazed assembly may be removed for inspection, characterization and/or evaluation. In another exemplary embodiment the dwell temperature may be 1425 C.

The brazing material will flow and allow for wetting of the surfaces of the ceramic materials being joined. When ceramic such as aluminum nitride is joined using silicon brazing layers and in the presence of sufficiently low levels of oxygen and described herein, the joint is a hermetic brazed joint.

Joined assemblies joined as described above result in pieces with hermetic sealing between the joined pieces. Such assemblies are then able to be used where atmosphere isolation is an important aspect in the use of the assemblies. Further, the portion of the joint which may be exposed to various atmospheres when the joined assemblies are later used in semi-conductor processing, for example, will not degrade in such atmospheres, nor will it contaminate the later semi-conductor processing.

Both hermetic and non-hermetic joints may join pieces strongly, in that significant force is needed to separate the pieces. However, the fact that a joint is strong is not determinative of whether the joint provides a hermetic seal. The ability to obtain hermetic joints may be related to the wetting of the joint. Wetting describes the ability or tendency of a liquid to spread over the surface of another material. If there is insufficient wetting in a brazed joint, there will be areas where there is no bonding. If there is enough non-wetted area, then gas may pass through the joint, causing a leak. Wetting may be affected by the pressure across the joint at different stages in the melting of the brazing material. The use of mesa standoffs, or other standoff device such as the insertion of ceramic spheres or powder particles of appropriate diameter, to limit the compression of the brazing layer beyond a certain minimum distance may enhance the wetting of the areas of the joint. Careful control of the atmosphere seen by the brazing element during the joining process may enhance the wetting of the areas of the joint. In combination, careful control of the joint thickness, and careful control of the atmosphere used during the process, may result in a complete wetting of the joint interface area that is not able to be achieved with other processes.

Another advantage of the joining method as described herein is that joints made according to some embodiments of the present invention may allow for the disassembly of components, if desired, to repair or replace one of those two components. Because the joining process might not modify the ceramic pieces by diffusion of a joining layer into the ceramic, the ceramic pieces are thus possibly able to be re-used.

Figure 12:
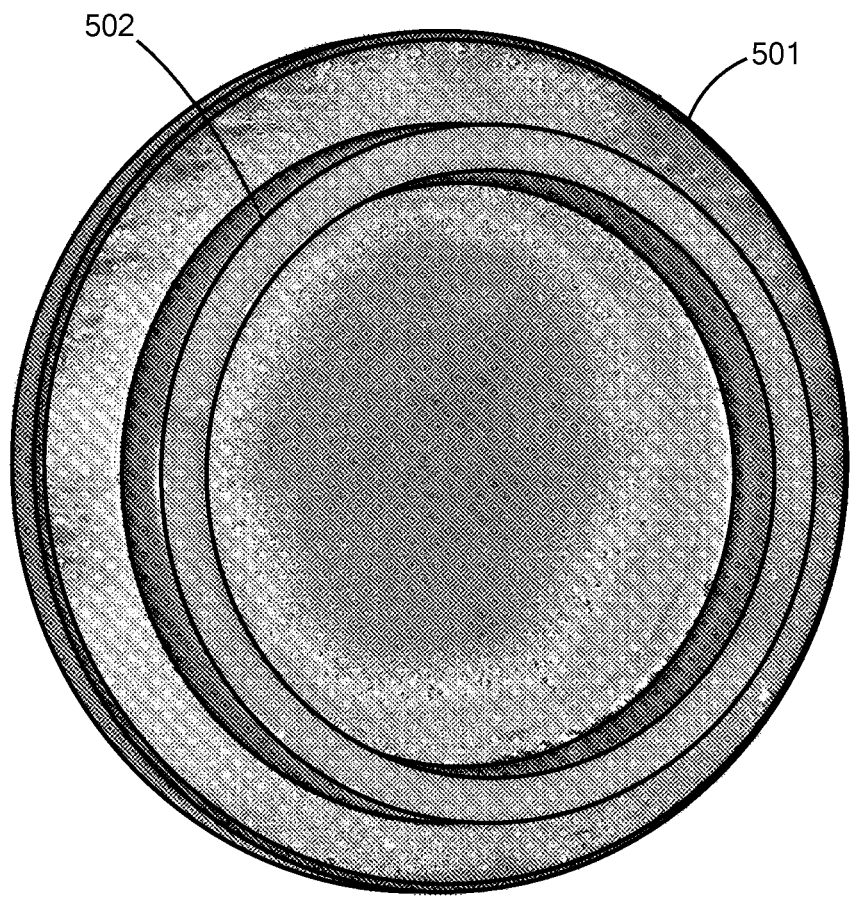
FIG. 12 is a photograph of a ceramic assembly with a silicon joint according to some embodiments of the present invention.
Figure 13:
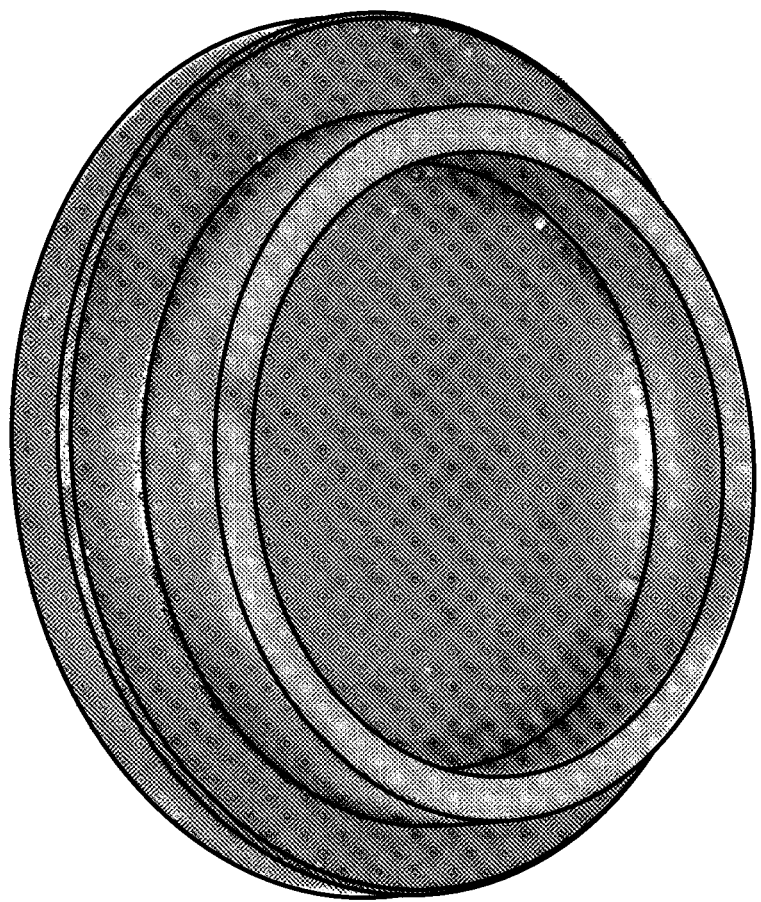
FIG. 13 is a photograph of a ceramic assembly with a silicon joint according to some embodiments of the present invention.

In an exemplary embodiment, a first ceramic piece of poly-crystalline aluminum nitride is joined to a second piece of poly-crystalline aluminum nitride (AlN) with a silicon brazing layer. As seen if FIGS. 12 and 13, the first ceramic piece 501 may be a circular plate of AlN. The second ceramic piece 502 may be a cylindrical ring. The joining of the first ceramic piece 501 and the second ceramic piece 502 is illustrative of the joining of a plate and shaft, such as with a heater, or an electrostatic chuck, used to support semiconductor processing. A silicon joining layer 503 has hermetically joined the first piece 501 to the second piece 502.

The silicon joining layer 503 is Si powder which is 99.5% Si powder. The brazing process was performed in a process oven at a pressure of 1×10E-4 Torr. The brazing temperature was 1425 C and was held for 10 minutes. The resulting joint was hermetic. Hermeticity was verified by having a vacuum leak rate of <1×10E-9 sccm He/sec; as verified by a standard commercially available mass spectrometer helium leak detector.

Figure 14:
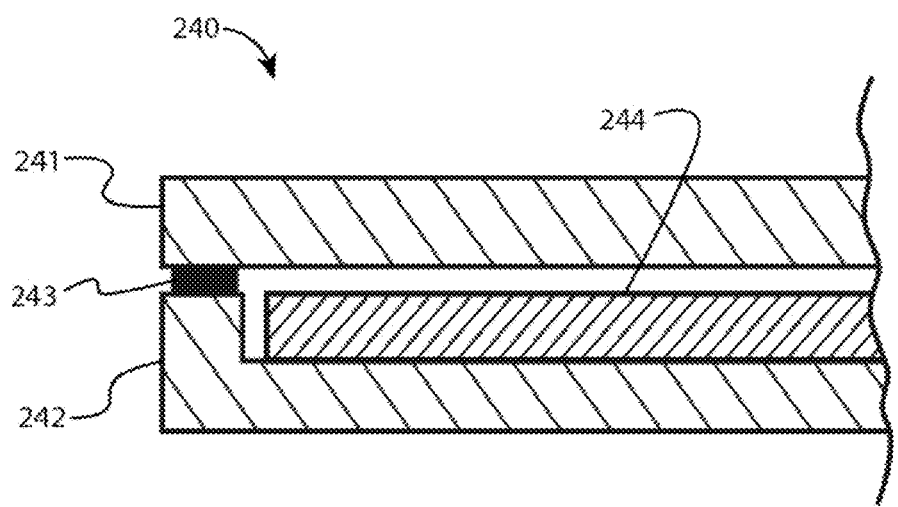
FIG. 14 is a cross-sectional view of a multi-layer plate assembly according to some embodiments of the present invention.

FIG. 14 illustrates a partial cross-section of a plate assembly according to some embodiments of the present invention. A multi-layer plate assembly is another device which may be made with the processes described herein. The plate assembly 240 may be adapted to be joined to a shaft to complete a plate and shaft assembly. The top plate layer 241 may be a circular disc adapted to support a substrate during semiconductor processing steps. A heater 244 is adapted to reside below the top plate layer 241. The heater may be attached or adhered to one or both of the plate layers. The top plate layer 241 overlays the bottom plate layer 242. A joining layer 243 joins the top plate layer 241 to the bottom plate 242. The joining layer may be an annular disc. In some embodiments, the top plate layer and the bottom plate layer are ceramic. In some embodiments, the top plate layer and the bottom plate layer are aluminum nitride. In some embodiments the joining layer is silicon.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A multi-layer ceramic plate assembly for use in semiconductor processing, said multi-layer ceramic plate assembly comprising:
   an upper plate layer, said upper plate layer adapted to support a semiconductor substrate, said upper plate layer comprising aluminum nitride;
   a lower plate layer, said lower plate layer comprising aluminum nitride;
   said upper plate layer and said lower plate layer joined together to form an interior space between said upper plate layer and said lower plate layer within an annulus of an annular joining layer, and
   an annular joining layer disposed between an aluminum nitride surface of said upper plate layer and an aluminum nitride surface of said lower plate layer, wherein said annular joining layer joins an outer periphery of said upper plate layer to an outer periphery of said lower plate layer, wherein an entirety of said joining layer comprises more than 98% silicon by weight, and wherein said joining layer hermetically seals said interior space between said upper plate layer and said lower plate layer from the exterior of said ceramic plate assembly through said joining layer, wherein said annular joining layer has not diffused into either said upper plate layer or said lower plate layer.

2. The multi-layer ceramic plate assembly of claim 1 wherein said joining layer comprises silicon of greater than 99% silicon by weight.

3. The multi-layer ceramic plate assembly of claim 1 further comprising a heater residing between said upper plate layer and said lower plate layer.

4. The multi-layer ceramic plate assembly of claim 2 further comprising a heater residing between said upper plate layer and said lower plate layer.

5. The multi-layer ceramic plate assembly of claim 1 further comprising a heater residing between said upper plate layer and said lower plate layer, wherein said joining layer comprises a ring around the outer periphery of said heater, said ring having an inner diameter larger than the maximum diameter of said heater.

6. The multi-layer ceramic plate assembly of claim 1 further comprising a planar electrode residing between said upper plate layer and said lower plate layer.

7. The multi-layer ceramic plate assembly of claim 2 further comprising a planar electrode residing between said upper plate layer and said lower plate layer.

8. A multi-layer ceramic plate assembly for use in semiconductor processing, said multi-layer ceramic plate assembly comprising:
   an upper plate layer, said upper plate layer adapted to support a semiconductor substrate, said upper plate layer comprising aluminum nitride;
   a lower plate layer, said lower plate layer comprising aluminum nitride;
   said upper plate layer and said lower plate layer joined together to form an interior space between said upper plate layer and said lower plate layer within an annulus of an annular joining layer, and
   an annular joining layer disposed between an aluminum nitride surface of said upper plate layer and an aluminum nitride surface of said lower plate layer, wherein said annular joining layer joins an outer periphery of said upper plate layer to an outer periphery of said lower plate layer, wherein an entirety of said joining layer comprises more than 98% silicon by weight, and wherein said joining layer hermetically seals said interior space between said upper plate layer and said lower plate layer from the exterior of said ceramic plate assemble through said joining layer, wherein the hermetic seal seals said interior space between said upper plate layer and said lower plate layer at a vacuum leak rate of <1×10E-9 sccm He/sec.

9. The multi-layer ceramic plate assembly of claim 8 wherein said joining layer comprises silicon of greater than 99% silicon by weight.

10. The multi-layer ceramic plate assembly of claim 9 further comprising a heater residing between said upper plate layer and said lower plate layer.

11. The multi-layer ceramic plate assembly of claim 8 further comprising a heater residing between said upper plate layer and said lower plate layer.

12. The multi-layer ceramic plate assembly of claim 8 further comprising a heater residing between said upper plate layer and said lower plate layer, wherein said joining layer comprises a ring around the outer periphery of said heater, said ring having an inner diameter larger than the maximum diameter of said heater.

13. The multi-layer ceramic plate assembly of claim 8 further comprising a planar electrode residing between said upper plate layer and said lower plate layer.

14. The multi-layer ceramic plate assembly of claim 9 further comprising a planar electrode residing between said upper plate layer and said lower plate layer.

15. A multi-layer ceramic plate assembly for use in semiconductor processing, said multi-layer ceramic plate assembly comprising:
   an upper plate layer, said upper plate layer adapted to support a semiconductor substrate, said upper plate layer comprising aluminum nitride;
   a lower plate layer, said lower plate layer comprising aluminum nitride;
   said upper plate layer and said lower plate layer joined together to form an interior space between said upper plate layer and said lower plate layer within an annulus of an annular joining layer, and
   an annular joining layer disposed between an aluminum nitride surface of said upper plate layer and an aluminum nitride surface of said lower plate layer, wherein said annular joining layer joins an outer periphery of said upper plate layer to an outer periphery of said lower plate layer, wherein an entirety of said joining layer comprises more than 98% silicon by weight, and wherein said joining layer hermetically seals said interior space between said upper plate layer and said lower plate layer from the exterior of said ceramic plate assemble through said joining layer, wherein said annular joining layer is greater than or equal to about 0.001 inches to less than or equal to about 0.01 inches thick.

16. The multi-layer ceramic plate assembly of claim 15 wherein said joining layer comprises silicon of greater than 99% silicon by weight.

17. The multi-layer ceramic plate assembly of claim 16 further comprising a heater residing between said upper plate layer and said lower plate layer.

18. The multi-layer ceramic plate assembly of claim 15 further comprising a heater residing between said upper plate layer and said lower plate layer.

19. The multi-layer ceramic plate assembly of claim 15 further comprising a heater residing between said upper plate layer and said lower plate layer, wherein said joining layer comprises a ring around the outer periphery of said heater, said ring having an inner diameter larger than the maximum diameter of said heater.

20. The multi-layer ceramic plate assembly of claim 15 further comprising a planar electrode residing between said upper plate layer and said lower plate layer.

* * * * *